United States Patent [19]

Benedetti

[11] 4,402,118
[45] Sep. 6, 1983

[54] CLIP FOR SECURING A PANEL TO A SUPPORT

[75] Inventor: Nicholas M. Benedetti, Sterling Heights, Mich.

[73] Assignee: USM Corporation, Farmington, Conn.

[21] Appl. No.: 306,197

[22] Filed: Sep. 28, 1981

[51] Int. Cl.³ .............................................. F16L 33/12
[52] U.S. Cl. ........................................ 24/289; 24/293; 24/295; 52/718
[58] Field of Search ................ 24/294, 293, 295, 297, 24/259 R, 289; 52/718

[56] References Cited

U.S. PATENT DOCUMENTS

| | | | |
|---|---|---|---|
| 2,100,551 | 11/1937 | Reiter | 24/259 R |
| 2,188,026 | 1/1940 | Wiley | 24/293 |
| 2,329,688 | 9/1943 | Bedford | 24/294 |
| 3,977,048 | 8/1976 | Benedetti | 24/293 |
| 4,043,579 | 8/1977 | Meyer | 24/293 |

FOREIGN PATENT DOCUMENTS

| | | | |
|---|---|---|---|
| 1195503 | 11/1959 | France | 24/294 |
| 1420514 | 11/1965 | France | 24/294 |
| 858018 | 1/1961 | United Kingdom | 24/294 |

*Primary Examiner*—John J. Wilson
*Attorney, Agent, or Firm*—Alan N. McCartney

[57] ABSTRACT

A generally "U" or "V" shaped clip type fastener adapted to secure a projection on one part in an opening or aperture in another part. The fastener has a lead portion for insertion into the opening with locking tabs for attachment to the projection and a trailing locking portion which passes over the projection and has oppositely disposed locking shoulder abutting the sides of the opening to lock the projection into the opening. In this arrangement, the clip can be inserted onto the projection with the locking tabs retaining the clip on the projection. The part with the projection can then be secured to the part with the opening by merely inserting the clip into the opening and forcing the parts together to "snap fit" the clip into the opening.

7 Claims, 8 Drawing Figures

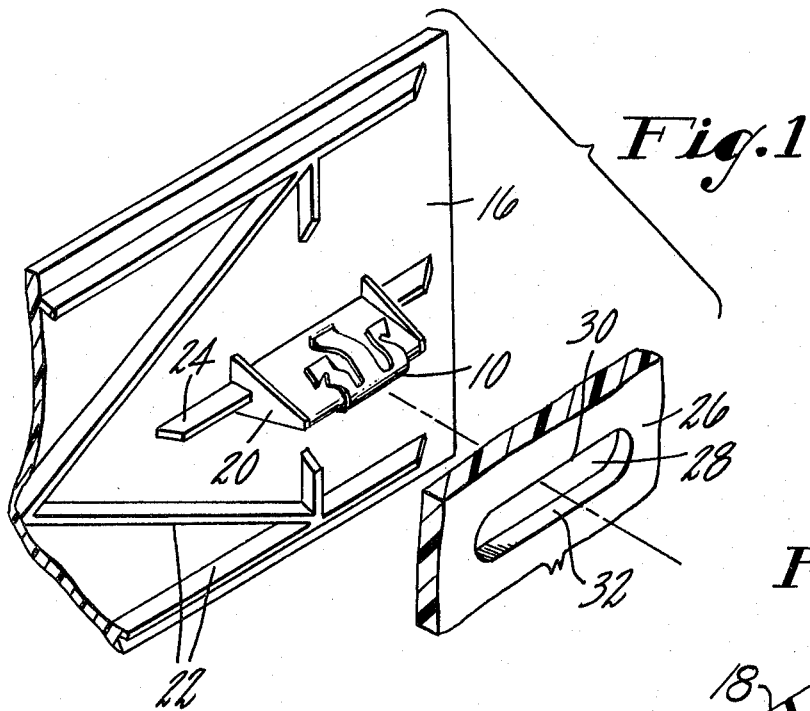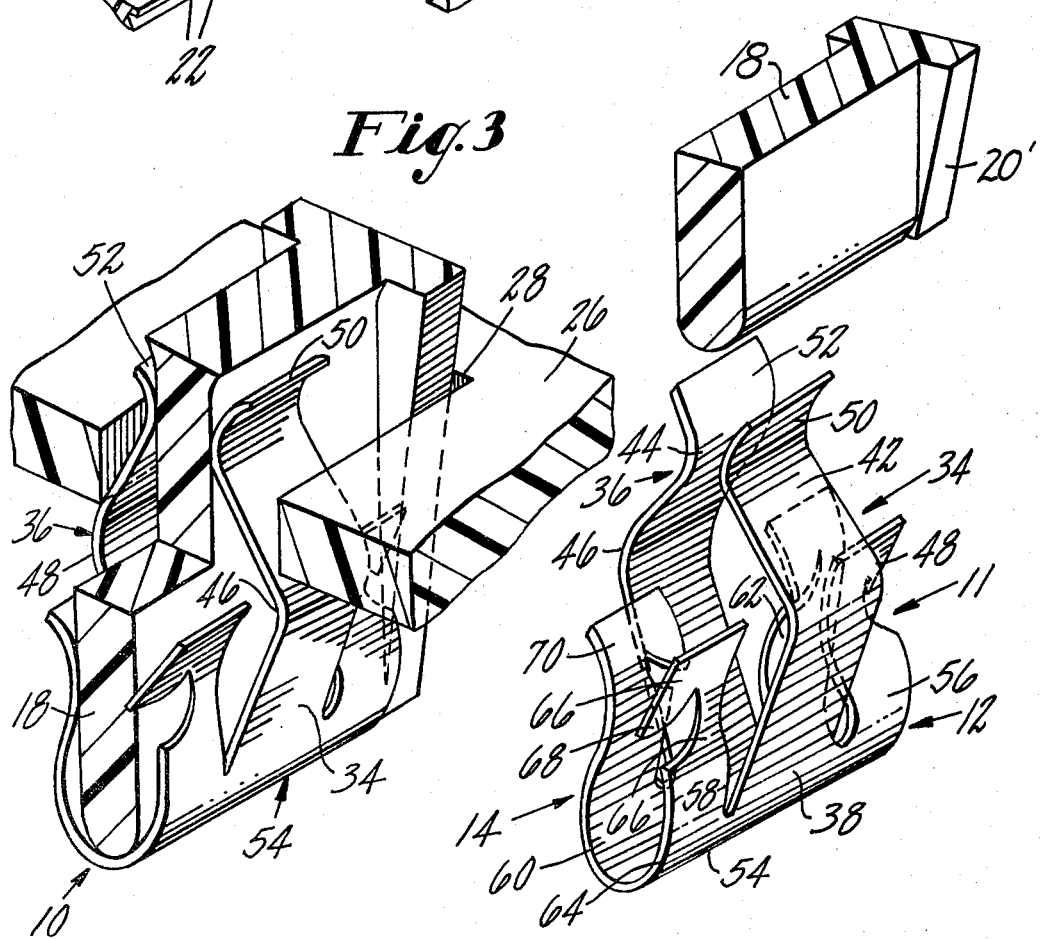

CLIP FOR SECURING A PANEL TO A SUPPORT

BACKGROUND OF THE INVENTION

This invention relates to threadless, clip type fasteners adapted to retain a panel to a support by snap fitting the parts together. More particularly, the invention relates to force fitting a projection on a panel or cover into a slotted type opening in a support by means of a spring steel clip.

The prior art has long been known to force fit one part to another by means of a clip having locking tabs attachable to one of or both of the parts. These clips or fasteners are made of spring steel such as shown in U.S. Pat. No. 3,977,048 or 4,043,579. Other types of clip fasteners are also designed to snap fit parts of various configuration together where a portion of the clip follows the general contour of one of the parts. This is illustrated by U.S. Pat. No. 4,175,303. Other types of materials such as plastic have also been used to secure one part to another such as illustrated in U.S. Pat. No. 3,659,320.

It is well recognized that many different types of spring clip fasteners have been used for various applications and they are designed to be adaptable for specific environments and particular applications. They are designed for ease of use and for quickly assembling parts together, especially where thread type fasteners cannot be used because of space limitations or where the fastener itself should not be exposed.

None of these fasteners, however, permit a projection on one member to be easily assembled into the slot of another member by snap fitting the members together and at the same time permitting the members to be disassembled or separated without any special tooling.

SUMMARY OF THE INVENTION

In the spring clip environment, it is an object of this invention to provide a means to secure one part to another by a snap fit spring clip where the parts can be readily disassembled.

It is another object of this invention to secure a projection on a panel or other decorative piece into an opening in a support by means of a spring clip that is locked onto the projection and has locking shoulders acting against the opening to "snap fit" the panel to the support while permitting removal of the panel from the support.

The one piece spring clip has opposed sides that are substantially symmetrical with centrally located oppositely disposed elongated legs that are adapted to be disposed in a loaded condition on opposite sides of a projection on a panel type member. Carried on each side of the elongated legs are opposed shorter locking leg portions that have tabs that are adapted to lock into each side of the projection in a loaded condition to securely fasten the clip to the projection. The elongated legs have a leading edge disposed at an angle for inserting the clip into the opening of a support and trailing edge with a holding angle adapted to act against the sides of the opening to secure the clip and projection of the panel into the opening of the support. The leading edge and trailing edge of the elongated legs merge into an opposed rounded shoulder areas that are under tension against the sides of the opening to secure the clip in the opening while permitting removal of the clip from the opening. The shoulder area of the elongated legs is of sufficient length to permit variable spacing between the panel and support.

BRIEF DESCRIPTION OF THE DRAWINGS

FIG. 1 is a perspective view of the panel and support with the inventive clip attached to the projection on the panel;

FIG. 2 is a perspective view of the inventive clip as it is being applied to the panel projection;

FIG. 3 is a perspective view partially in section of the clip retaining the panel projection into the opening of a support;

DESCRIPTION OF THE PREFERRED EMBODIMENT

Figure 4:
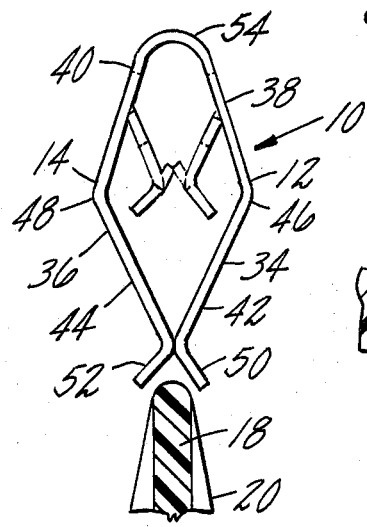
FIG. 4 is a side view of the inventive clip in its free state as it is about to be inserted onto the panel projection.
Figure 5:
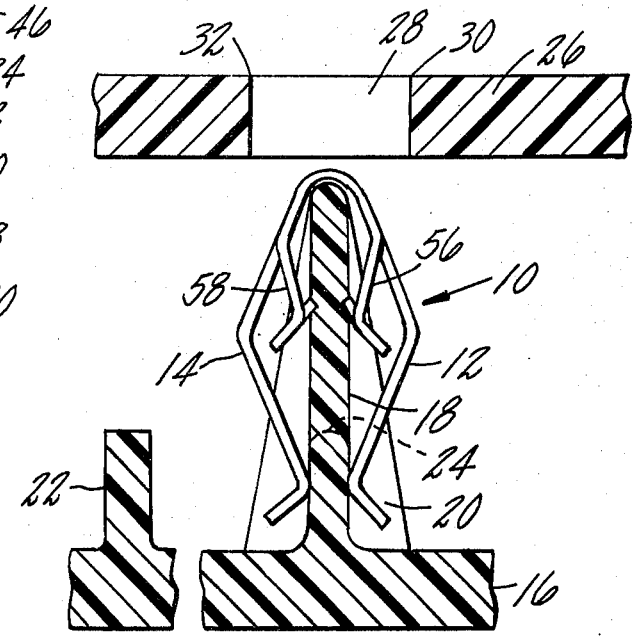
FIG. 5 is a side view of the inventive clip locked onto the panel projection and about to be inserted into the opening of a support.

While the following description relates to securing a panel to a support, it will be recognized that any member such as a cover, housing, plaque or other type of member having a projection can be secured into the opening in a support by means of the novel clip that is described in detail hereinafter.

Attention is now directed to the drawing which illustrates the novel clip 10 constructed of spring steel and formed in a "U" or "V" shape configuration. The clip 10 has substantially symmetrical opposed side members 12 and 14 that are adapted to be placed on the opposite sides of a projection 18 that is carried on a panel 16, for example. The panel 16 illustrated has ribs 20 and 20' that act as a support for projection 18 and aid in locating the clip on the projection, as will become apparent hereinafter.

The panel 16 also has reinforcing ribs 22 that act as spacers to place the panel the correct distance from the support to enable the clip to be securely fastened in the support. In the event ribs such as ribs 22 are not present on the panel type member, additional supports such as ribs 24 can be provided to strengthen the projection and act as spacers. Other types of spacers can also be used in the environment of this novel clip to act as the reaction member for the action of the clip on the support member, as will become apparent hereinafter.

The support member can be any type of support, for example the shift column, speaker housing etc. in an automobile. The support 26 illustrated has an elongated opening or slot 28 which has shoulders 30 and 32 against which the clip acts to connect the panel to the support.

Attention is now directed to the clip 10 which is a substantially symmetrical one-piece construction made of spring sheet metal. The clip comprises elongated centrally located legs 34,36 which have leading angle portions 38,40 and trailing angle portions 42,44 which merge into one another to form rounded locking shoulders 46,48 disposed at a predesigned locking angle depending on the application to which the clip is to be used. The trailing angle portions 42,44 have rounded outwardly angled lead portions 50,52 to facilitate placing the clip on the projection as illustrated in FIG. 4. The elongated legs 34,36 are connected at their leading edges by a rounded nose 54 that extends the entire length of the clip and acts as the main support for the locking portions of the entire clip.

At each side of the elongated legs 34,36 are projecting locking legs 56,58 adjacent the leg 34 and locking legs 60,62 adjacent the leg 36. These adjacent legs are oppositely disposed from one another and are connected together through the clip main support member 54, as shown. The locking legs are generally similar in configuration with each having a leading edge 64, a trailing edge 66 and a locking tab 68 disposed out of the face of the trailing edge 66. Each of the trailing edges 66 have a rounded, outwardly angled lead portion 70 to facilitate inserting the clip on the projection of the panel. The locking tabs 68 on the side 12 of the clip are on the outboard side of the clip while the locking tabs 68 on the side 14 of the clip are inwardly disposed adjacent the elongated legs as illustrated. This provides for greater locking action and lateral stability of the clip while in place on the projection. Thus, it can be seen that with the clip fully inserted on the projection, the elongated legs 34, 36 are under load against the projection and the locking tabs 68 through their respective leg members are also locked against the projection to securely fasten the clip to the projection.

The clip 10 in its free state has the two side members 12 and 14 in contact with one another or in a closed position with the locking tabs 68 also being in contact, as illustrated in FIG. 4. As the clip is inserted on the projection by the rounded lead portions 50,52 contacting the projection and the clip being forced open, the elongated legs 34,36 separate permitting the clip to pass onto the projection. As the clip passes down onto the projection, the rounded lead portions 70 of locking legs 56 to 62 abut the projection causing the locking legs on opposite sides of the clip to separate permitting the clip to pass all the way onto the projection, as illustrated. In this latter assembled condition, the locking tabs 68 lock into the sides of the projection on the panel to securely fasten the clip to the projection. In the instance of the use of ribs 18 on the projection, they function to aid the user in locating the clip properly on the projection.

After the clip is preassembled on the projection, the panel can be placed on the support by inserting the clip into the slots or openings 28 and forcing the panel toward the support. Initially, the locking legs 56 to 62 pass through the slot 28, because they are shorter and narrower in the area of their trailing edge 66. As the members move together, the elongated legs are forced together by the sides of the slot or opening until the locking shoulders 46,48 snap into the opening and the spacers or ribs abut the support. In this fashion, the locking shoulders act against the sides of the slot and the spacer acts as a reaction point for the force of the clip in the slot or opening. Also, in this assembeled condition, the ends of leads portions 70 of legs 56 to 62 are all the way through the slot or opening 28.

Figure 6:
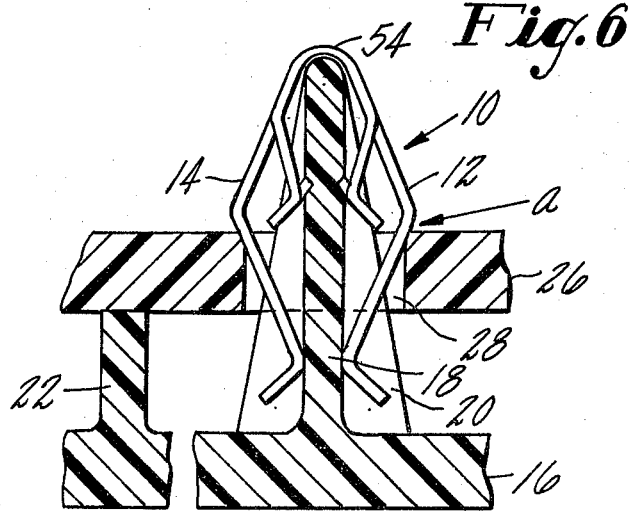
FIG. 6 is a side view of the panel and support being retained together by the clip of this invention.

As illustrated in the drawing, by the clip acting on the slot and being in a loaded condition through the reaction point at the spacer, a specifically designed angle of the locking shoulders 46,48 can be used to give more flexibility to the use of a particular clip. For example, in the environment illustrated, the support 26 could also have an additional decorative covering such as a rug and the locking shoulders would still lie on the outside edges of the slot and thus lock the panel to the support. Because the shoulders are holding against the opening in area (a) (FIG. 6), the panel 16 can be moved away from the support 26 that distance (a) and the clip would still retain the parts in assembled relation.

It should also be noted that the rounded shoulder locking action of the clip against the side of the slot also permits the parts to be separated by merely pulling them apart without the use of any special tooling. The elongated legs would be forced together until the locking shoulders clear the sides of the slot and the parts can be separated. In this manner, the novel clip of this invention is readily adaptable for use in an environment where it may be necessary to separate the parts, for example to gain access to the interior of the support.

In many applications of this novel clip, more than one projection and slot arrangement would be used to secure the panel to the support. In that instance, the slots can be made longer than the clips to facilitate locating the projections in the slots and centering or placing the panel in the desired relationship with respect to the support.

Further, it should also be noted that the gripping on the projection of the opposed locking legs with tabs and centrally located elongated locking legs, greater lateral stability of the parts is accomplished when the elongated projection is in the slot of the support. Additionally, it is contemplated within the scope of this invention that pairs or sets of opposed elongated legs 34, 36 can be used to obtain greater holding power of the clip in the support opening. This can also be accomplished by using a wider centrally located area on the clip.

Figure 7:
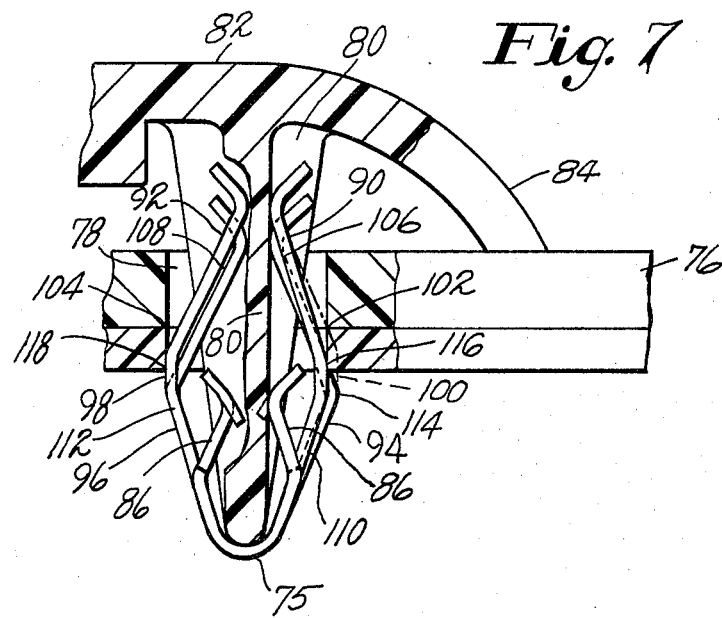
FIG. 7 is a side view of the panel and support being retained together with a clip modification having double acting dual center locking legs; the left portion of the view showing the clip in its free state and right portion of the view showing the clip locked to either a plain support or a support including a cloth covering such as a rug.
Figure 8:
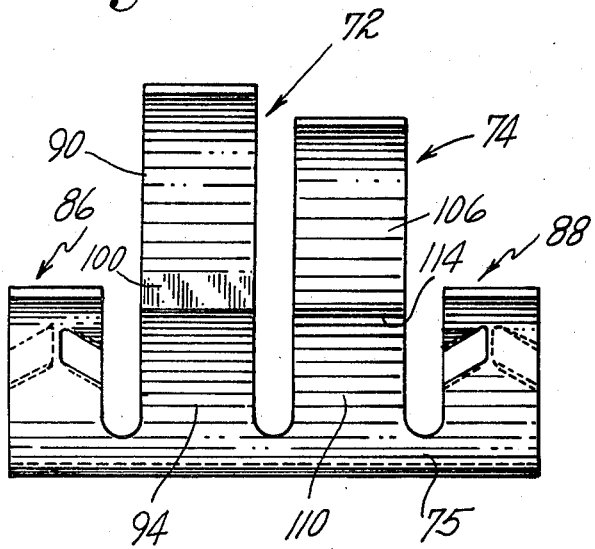
FIG. 8 is a plan view of the modified clip illustrated in FIG. 7.

Attention is now directed to FIGS. 7 and 8 which illustrate a modification having dual opposed centrally located locking legs 72 and 74. The elongated legs 72 extend outwardly further from the clip main support 75 than the shorter locking legs 74 to provide a dual locking means to accommodate various thicknesses of the support 76 as will become apparent hereinafter.

This clip is also designed to retain projection 80 on panel 82 into opening or slot 78 on support 76. A spacer 84 on the panel also acts as a reaction point for the clip when the panel is retained on the support. This clip is also retained on the panel projection by means of locking legs 86. 88 that function in the same fashion as locking legs 56 to 62, as illustrated in the drawing.

The longer locking leg 72 include opposed leading portions 90, 92 and opposed trailing portions 94, 96 that merge into opposed locking shoulders 98. The shoulders 98 act on the side edges 102, 104 of the slot or opening 78 in the same fashion as the locking shoulders 46, 48. This is the action of the clip when utilized with a plain panel support. When the panel is applied to a support of greater thickness, such as a support covered by a cloth or rug, the locking legs 74 of the clip are utilized to retain the panel on the support.

The locking legs 74 have opposed leading portions 106, 108 and opposed trailing portions 110, 112 that merge into locking shoulders 114. The locking shoulders 114 act against the side edges 116, 118 of the opening 78 in the support in the same fashion as the other clip locking shoulders. Thus, when the clip is applied to a support of greater thickness, the locking shoulders 114 of the shorter opposed centrally located legs 74 act against the support opening since those locking shoulders are disposed inwardly. Additionally, the locking shoulders 98 are flattened or relieved in the area 100 outwardly from locking shoulders 114 so that when the clip is applied to the thicker support, the shoulders 114 are able to fully act on the support opening edges. When the clip thus described is used on the thicker support, the shoulders 98 act on the side edges 102, 104 of the opening and shoulders 114 act on the eddges 116, 118 of the opening as illustrated in FIG. 7. The clip thus can function as a dual or double acting locking member. In this manner the clip is provided with greater versatility of application.

Having thus described my invention, what I claim as new and novel and desire to secure by Letters Patent of the United States is:

1. A resilient clip for retaining a projection on a panel into an opening in a support, comprising:
   (a) substantially symmetrical opposed side members adapted to lock against the sides of the projection;
   (b) a central rounded main support member connecting said side members together to form a substantially "U" or "V" shape configuration to the clip;
   (c) said side members having opposed elongated centrally located legs with rounded locking shoulders and means for engaging the sides of the projection;
   (d) each of said side members also having substantially symmetrical opposed separate locking legs disposed adjacent said centrally located legs so that the locking legs of one side member oppose the locking legs of the other side member;
   (e) each of said locking legs having locking tabs spaced apart from said engaging means and adapted to lock against the sides of the projection in a loaded condition;
   (f) said locking shoulders extending outwardly away from one another and are adapted to lock against the sides of the opening in the support to load said engaging means against the sides of the projection and to retain the projection of the panel into the opening in the support while permitting removal of the panel from the support.

2. The resilient clip of claim 1 wherein the side members have a leading edge and a trailing edge with rounded outwardly angled lead portions on the leading edge to facilitate inserting the clip on the projection.

3. The resilient clip of claim 1 wherein the locking tabs on one side member are disposed outwardly and the locking tabs on the opposite side member are disposed inwardly adjacent the centrally located legs so that the opposed locking tabs are offset from one another.

4. The resilient clip of claim 1 wherein the centrally located legs are substantially in contact with each other in the free state of the clip and are adapted to be under load against the sides of the projection when the clip is in position on the projection.

5. The clip of claim 1 wherein a space means in contact with the support and panel coacts with the clip to load the locking shoulders against the sides of the opening in the support.

6. The resilient clip of claim 1 wherein the centrally located legs are a plurality of adjacent leg members having juxtapositioned locking shoulders outwardly displaced from one another so that the clip can retain the panel on supports of varying thickness.

7. The resilient clip of claim 1 wherein the centrally located legs are separate opposed dual adjacent leg members with locking shoulders displaced from one another on the adjacent legs so that the locking shoulders of the clip can act on support openings of varying depth.

* * * * *